US011748681B1

(12) United States Patent
Takhtani et al.

(10) Patent No.: US 11,748,681 B1
(45) Date of Patent: Sep. 5, 2023

(54) PERSISTENT STATE MANAGEMENT SYSTEM FOR WEB APPLICATIONS

(71) Applicant: Amazon Technologies, Inc., Seattle, WA (US)

(72) Inventors: Krishanu Takhtani, Jabalpur (IN); Akashdeep Bhattacharya, Asansol (IN); Karan Juneja, Abohar (IN)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 17/475,115

(22) Filed: Sep. 14, 2021

(51) Int. Cl.
| G06F 15/16 | (2006.01) |
| G06F 21/31 | (2013.01) |
| H04L 29/06 | (2006.01) |
| H04L 29/08 | (2006.01) |
| G06Q 10/0633 | (2023.01) |
| G06F 16/22 | (2019.01) |
| H04L 67/142 | (2022.01) |

(52) U.S. Cl.
CPC ......... *G06Q 10/0633* (2013.01); *G06F 16/22* (2019.01); *H04L 67/142* (2013.01)

(58) Field of Classification Search
CPC .... G06Q 10/0633; G06F 16/22; H04L 67/142
See application file for complete search history.

(56) References Cited

U.S. PATENT DOCUMENTS

| 7,302,370 | B2 * | 11/2007 | Nickerson | G06F 16/957 |
| | | | | 709/224 |
| 7,680,683 | B2 * | 3/2010 | Hilerio | G06Q 10/10 |
| | | | | 705/7.27 |
| 9,003,299 | B2 * | 4/2015 | Freedman | H01B 7/292 |
| | | | | 715/745 |
| 9,244,993 | B1 * | 1/2016 | Adoc, Jr. | G06F 16/27 |
| 9,495,338 | B1 * | 11/2016 | Hollis | G06F 40/143 |
| 9,710,307 | B1 * | 7/2017 | Corley | G06F 9/4881 |
| 9,940,602 | B1 * | 4/2018 | Messenger | G06Q 10/087 |
| 10,346,626 | B1 * | 7/2019 | Pratt | G06F 21/6218 |
| 10,469,665 | B1 * | 11/2019 | Bell | H04L 67/535 |
| 10,771,586 | B1 * | 9/2020 | Pratt | H04L 63/20 |
| 11,210,464 | B2 * | 12/2021 | Sharshevsky | G06F 40/14 |
| 11,249,974 | B1 * | 2/2022 | Fuchs | G06F 16/2255 |
| 2002/0138543 | A1 * | 9/2002 | Teng | G06Q 10/06 |
| | | | | 707/E17.005 |

(Continued)

*Primary Examiner* — Kevin T Bates
*Assistant Examiner* — Golam Mahmud
(74) *Attorney, Agent, or Firm* — Klarquist Sparkman, LLP

(57) ABSTRACT

A User State Management Service (USMS) stores, in a backend database, the progress of a workflow of a web-based application, and the state of the attributes in the webpages of the workflow. When the workflow is interrupted and resumed at a later time, the application can receive from the USMS the progress step where it was last in and the states and/or values of the attributes and repopulate the states and/or values of the attributes. The data are stored in a database can be configured using optimized organizations and can be device-independent, and the USMS can work persistently across different platforms and devices. The USMS can be a service, for example, software provided at a server, or servers, over the web or the cloud. The USMS can include an application interface which can improve performance and provide device and browser independence and scalability.

20 Claims, 11 Drawing Sheets

600

StateAttributeInformationTable

| userId_applicationName | stepName | htmlIdValueMap | timestamp |
|---|---|---|---|
| SELLERID01_SellerRegistrationWorkflow | Dashboard | <seller_legal_name_html_id, FIRSTN LASTN>, <gst_number_html_id, 123456789>, <pan_number_html_id, 1234356> | 1526787890897 |
| ... | ... | ... | ... |

610

602 604 606 608

(56) References Cited

U.S. PATENT DOCUMENTS

| | | | | |
|---|---|---|---|---|
| 2009/0063690 A1* | 3/2009 | Verthein | ........... | H04L 67/14 |
| | | | | 709/228 |
| 2012/0096069 A1* | 4/2012 | Chan | ........... | G06F 9/4856 |
| | | | | 709/203 |
| 2012/0166525 A1* | 6/2012 | Dittrich | ........... | G06Q 10/0633 |
| | | | | 709/203 |
| 2014/0047028 A1* | 2/2014 | Buth | ........... | G06F 9/546 |
| | | | | 709/204 |
| 2016/0132214 A1* | 5/2016 | Koushik | ........... | G06F 8/61 |
| | | | | 715/741 |
| 2017/0075949 A1* | 3/2017 | Stefani | ........... | G06F 16/278 |
| 2018/0219759 A1* | 8/2018 | Brown | ........... | G06Q 10/109 |
| 2019/0268156 A1* | 8/2019 | Delmas | ........... | G06F 21/31 |
| 2019/0394162 A1* | 12/2019 | Chalakov | ........... | H04L 67/568 |
| 2020/0310845 A1* | 10/2020 | Liguori | ........... | G06F 9/5038 |
| 2021/0136027 A1* | 5/2021 | Barbitta | ........... | H04L 67/306 |
| 2021/0406267 A1* | 12/2021 | Moore | ........... | G06F 21/6227 |

* cited by examiner

FIG. 6

StateAttributeInformationTable

| userid_applicationName | stepName | htmlIdValueMap | timestamp |
|---|---|---|---|
| SELLERID01_SellerRegistrationWorkflow | Dashboard | <seller_legal_name_html_id, FIRSTN LASTN>, <gst_number_html_id, 123456789>, <pan_number_html_id, 1234356> | 1526787390097 |
| ... | ... | ... | ... |

FIG. 7

TaggedAttributeInformationTable

| userid_applicationName | taggedVariableName | htmlIdValueMap | timestamp |
|---|---|---|---|
| SELLERID01_SellerRegistrationWorkflow | LegalName | FIRSTN LASTN | 152678789999 |
| ... | ... | ... | ... |

702　704　706　708

710

PERSISTENT STATE MANAGEMENT SYSTEM FOR WEB APPLICATIONS

BACKGROUND

In modern web applications, which most business use-cases require multi-step, multi-page web apps consisting of a series of ordered steps resulting in a formation of a workflow. The users often leave the workflow incomplete and return later. The user state needs to be maintained throughout the workflow. Additionally, the user state also needs to be maintained even when the user changes to new devices.

BRIEF DESCRIPTION OF THE DRAWINGS

FIG. 6 shows an example data structure to store data of a step in the workflow.

FIG. 7 shows an example data structure to store tagged data attributes of a webpage.

DETAILED DESCRIPTION

Figure 1A:
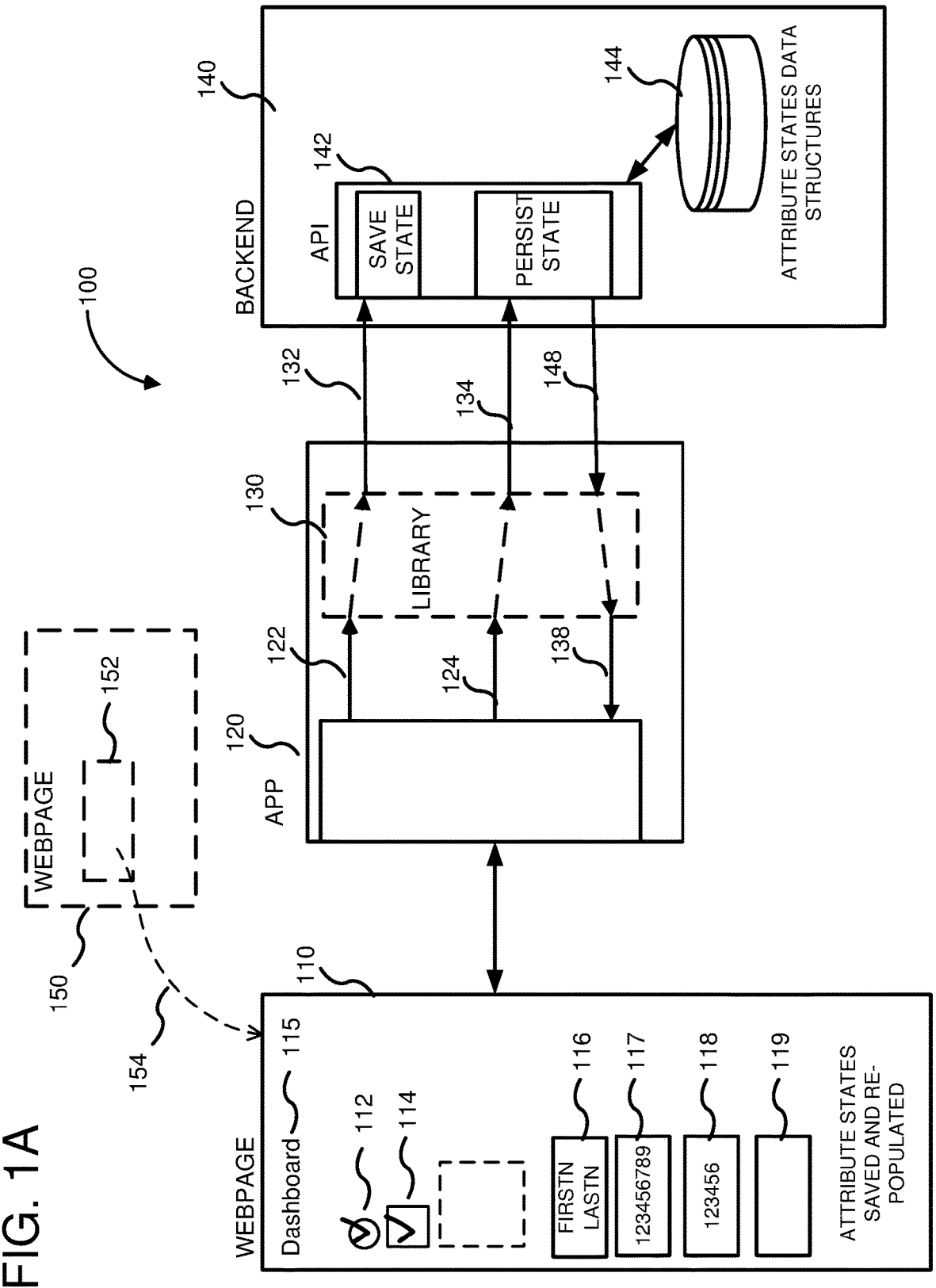
FIG. 1A shows an example system for persisting a user state in a web-based application.

In modern web applications, the need to maintain user state is of utmost importance as it greatly adds to positive customer experience. In addition to single page applications, most business use-cases need multi-step, multi-page web apps consisting of a series of ordered steps resulting in a formation of a workflow. The user state needs to be maintained throughout the workflow which can consist of multiple steps and pages. Additionally, the user state also needs to be maintained even when the user changes to new devices.

Many web-based applications have user interactive attributes, or can be referred to as attributes, on their webpages. These include, for example, buttons, checkboxes, input boxes, progress bars, etc. Users interact with these attributes, for example, by selecting buttons, checking checkboxes, entering input in input boxes, etc. In some cases, a webpage can proceed to a next page or pages in a workflow. A workflow can also have only one page. As disclosed herein, a User State Management Service (USMS) stores, in a backend database, the progress of a user through the workflow of an application (e.g., the webpages accessed by the user) and the states of the attributes in the webpages of the workflow. When the user leaves the workflow in the middle, and returns to the application at a later time, the application can receive from the USMS the last accessed step (for example, a webpage) where the user was last in, and the states of the attributes at the time the user was last in the webpage. The user can continue where the user left off, with the states of the attributes repopulated, without the user having to re-enter data already entered. The data stored in the database can be configured using optimized organizations and can be device-independent, and the USMS can work persistently across different platforms and devices.

The USMS can be a service, for example, software provided at a server, or servers, over the web or the cloud. The USMS can include an application interface which can provide device and browser independence and scalability and provide improve performance. The application interface can provide an application programming interface (API) that applications (e.g., web applications) can use. For example, the API can include a function that web applications can call to save the states and/or values of webpage attributes. Web applications can then call another API function to receive the saved states and/or values. In an example, as an end user uses a web application and enters input for one or more attributes in a webpage of the application, the application can call a Save API function to save the inputs as states and/or values of the one or more attributes. The end user can leave or exit the application at any time. At a later time, for example, the end user can re-open the same webpage, the application can call a Persist API function to receive the saved attributes and populates the attributes of the webpage. In another example, the application can call a Redirect to Last Accessed Step API to retrieve the web address of a webpage last accessed by the user. This function can provide, for example, a step where the workflow was last visited or worked on. In another example, the application can select and tag an attribute which is used across webpages (or steps) in a workflow. The application can save the tagged attribute and retrieve it at any step throughout the workflow.

In order to save a state of a workflow and return to the same state later, three parameters are used: an application name, a unique user identifier, and a step name. The application name is a unique identifier of the application with which the user is interacting. The unique user identifier can be any alpha-numeric combination to identify a user. The step name identifies a location within a workflow of an application and can be associated with a webpage. A database is used that stores state information in a generic way that is retrievable using the three parameters as a primary key. Using such a system, clients do not have to create their own application programming interfaces (APIs) for storing use-case specific information. Instead, all state-related information for an application can be stored in a centralized database as a service. Additionally, the service can automatically map the retrieved state to HTML elements for a step in a workflow.

An application can initiate service requests to backend server or servers, and the server processes the requests and returns the appropriate responses. The service requests can be initiated using, for example, an application programming interface (API) request. For purposes of simplicity, service requests will be generally described herein as API requests, but it is understood that other service requests can be made. An API request is a programming interface to a defined request-response message system, for example, expressed in JSON or XML, which is exposed via the web—for example, by means of an HTTP-based web server. Thus, in some implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component.

The USMS, for example, can expose a RESTFul resource via a RESTFul API. This RESTFul API can be directly triggered from JavaScript. The USMS can provide a programming library directly accessible by web-based applications to manage the user's progress and the states of interactive attributes. The library can provide code for reducing client's effort of managing application states. For example, the library can determine the values of the attributes and send them as arguments to the API.

As described in more detail below, the application interface can improve technical performance of web applications, for example, by providing backend resources closer to the applications. The application interface can also provide a device and browser independent interface, for example, by being an intermediary layer between the applications and the backend system functions.

FIG. 1A shows an example system 100 for persisting a state (or can be referred to herein as user state) in a web-based application 120. In the example system 100, a web-based application 120 can render webpage 110 as a part of a workflow (not shown). The system 100 can also include an application interface 142, and backend system 140. The application interface 142 can be exposed to the web-application using, for example, an API. In some examples, the application 120 can include a library comprising functions to interface with the API 142. For example, the library 130 can be a JavaScript library integrated with (consumed by) a web-based application. In a cloud architecture, the backend system 140 can be located in the cloud.

The webpage 110 can be a step in a workflow of the application 120. The application 120 has a step with the step name 155, shown in this example as Dashboard. In some examples, the step name can be or can include human readable characters, and corresponds to a webpage in a workflow of an application. The step name can be unique within the namespace of an application, and can be associated with an address (e.g., URL of the webpage). A workflow is generally related to the sequence of steps that a user passes through in the application to achieve an outcome. For example, in an application for ordering an item from an online website, the workflow can include adding an item to a shopping cart, selecting a shipping address, selecting a payment, and receiving a confirmation page. The step name can be defined by the application 120. The webpage 110 can include interactive attributes, for example, check button 112, check box 114, input boxes 116, 117, 118, etc. As shown, the button 112 has been checked, for example, by an end user. The check box 114 has also been checked, input box 116 contains string value "FIRSTN LASTN", input box 117 contains numeric value "123456789", and input box 118 contains numeric value "123456". Input box 119 has not been accessed yet and has no input.

At various times, for example, at 122, the application 120 can determine information of a step in the workflow and save them at the backend server. Examples of when an application can save information of a step can include when a user selects an input (e.g., clicking on a button, submitting the page, etc.), when a user selects an input that leaves a webpage, for example, the user clicks on box 152 in webpage 150 causing the application to leave webpage 150 (at 154), and so on. In an example, the application 120 can call a Save State API function of the API 142 to save the information in a backend database 144. The information can include, for example, one or more interactive attributes and their states and/or values, the address (URL) of the webpage, a step name of the webpage, and one or more tagged attributes and their values. The address of the webpage can be stored against the step name in a map which becomes the last accessed step in a workflow, for example, before the user exits the workflow.

In some examples, the application 120 can call a function (not shown) in the library 130, which can generate a Save State API request and transmits the request, at 132, to the Save State API at the backend server API 142.

At other various times, for example, at 124, the application 120 can retrieve the saved information of a step in the workflow from the backend server. Examples of when the applications can retrieve information of a step can include when a webpage corresponding to the step is opened or accessed, when a user selects an input on another webpage causing the webpage to be rendered, and so on. For example, the application can call a Persist State API function to retrieve the information from the backend. The backend server API 142 can then retrieve the saved information from the database 144 and transmits the information in a response at 148 to the application 120. In some examples, a function (not shown) in the library 130 can generate a Persist State API request and transmits the request, at 134, to the Persist State API at the backend server API 142. Another function (not shown) in the library 130 can receive the response from the Persist State API at the backend server API 142, parses the response, which can include mapping htmlID's to their corresponding values, and transmits the information to the application 120.

As will be shown further herein, the use of unique user ID and unique application name as a key in some API requests, and the use of unique user ID, unique application name and step name as keys in some API requests can improve the technical performance of searching the database, especially when there is a very large number of users and applications in the system and/or when the database system enables priority retrieving of records using primary key (for example, Amazon DynamoDB™ enables retrieving records in O(1) time for queries that are referenced directly to the primary key). Additionally, tagged attributes can further be technically optimally retrieved across a workflow.

Figure 1B:
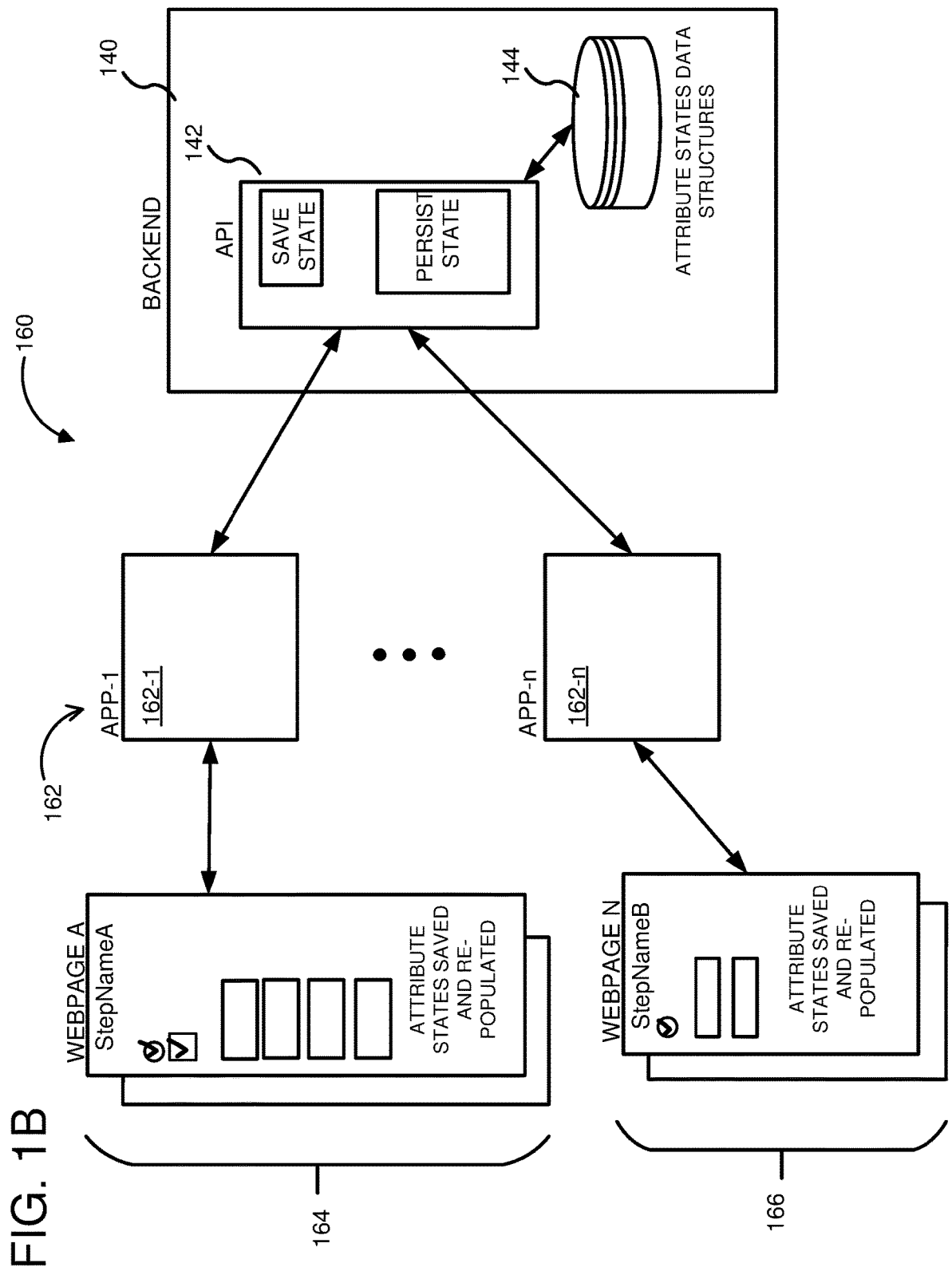
FIG. 1B shows an example system for persisting user states of a plurality of web-based applications.

FIG. 1B shows an example system 160 for persisting the states of a plurality of web-based applications 162. The applications 162 can be the same application (e.g., same Amazon application) or can be different applications (e.g., different Amazon apps and games, etc.). In the example system 160, application 162-1 is associated with workflow 164, application 162-n is associated with workflow 168. Each of the workflow 164 and 166 is associated with a plurality of webpages. Each webpage can be associated with a defined step name. The applications 162 can be opened by the same user, or by different users. The backend sever API 142 can be accessed by the applications 162 as described herein.

As shown herein, requests made to the backend API 142 include at least the user ID and the application name. This usage can allow the API 142 to be generic for use by different applications 162. For example, a user can leave different applications in incomplete states. Upon the user returning to the different applications, the system can provide the saved state of each application for the applications to return the user to the states according to each different application. In addition to the user ID and the application name, for API requests that also include a step name, e.g., Save State and Persist State API requests, the system can also provide the different applications with the saved step corresponding to each application. In the example system 160, application 162-1 can save and retrieve the attributes of the step at StepNameA, application 162-n can save and retrieve the attributes of the step at StepNameB. It should be noted that the workflows 164 and 166 can be distinct, therefore their step names can be the same. In some examples, application 162-1 and application 162-n can be distinct instances of an application opened by corresponding distinct users, each user having a unique user ID. In this case, the workflows 164 and 166 can include the same steps.

Figure 2:
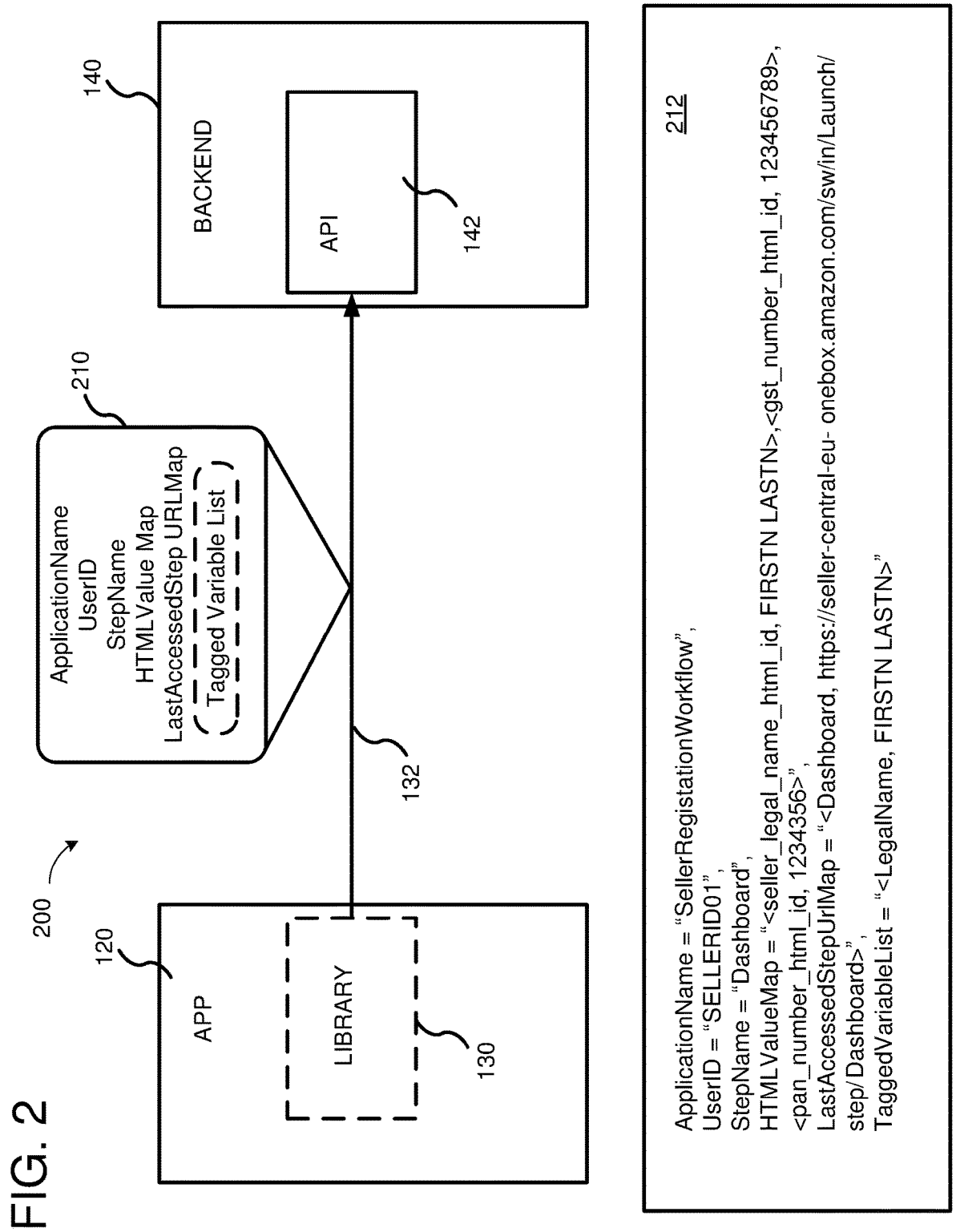
FIG. 2 is an example diagram showing an interface request call to save information of a step in a workflow.

FIG. 2 shows an example diagram 200 depicting an example Save State API request 210 and example arguments. The application 120 can determine when to save information of a step in the workflow at the backend server. In an example, the application 120 can determine the application name, the user identification (user ID) of the user, the name of the step (Step Name) of the webpage, for example, step name 115 (shown as "Dashboard"), and the current states and/or values of the attributes of the webpage that are to be saved. The user can be the end user of the application. The application can choose to store the step name as the last accessed step so that the user can land on the same step when accessing the workflow later. The application 120 can generate a Save State API request 132 comprising the above information and transmits the request to the Save State API function of the API 142 to save the information. Box 212 shows example arguments in a Save State API request 210. For example, the arguments can include an HTML map comprises the HTML attributes and their corresponding values for which the application wants to manage. The arguments can also include a Last Accessed Step URL map that comprises the pair of step name and the URL. The arguments can also include an optional tagged variable list. The tagged variable list can comprise pairs of attribute name and value. In some examples, the backend Save State API function then saves the information in a database 144, for example, Amazon DynamoDB database. The backend Save State API function can also provide a timestamp indicating the time of the save operation.

Figure 8:
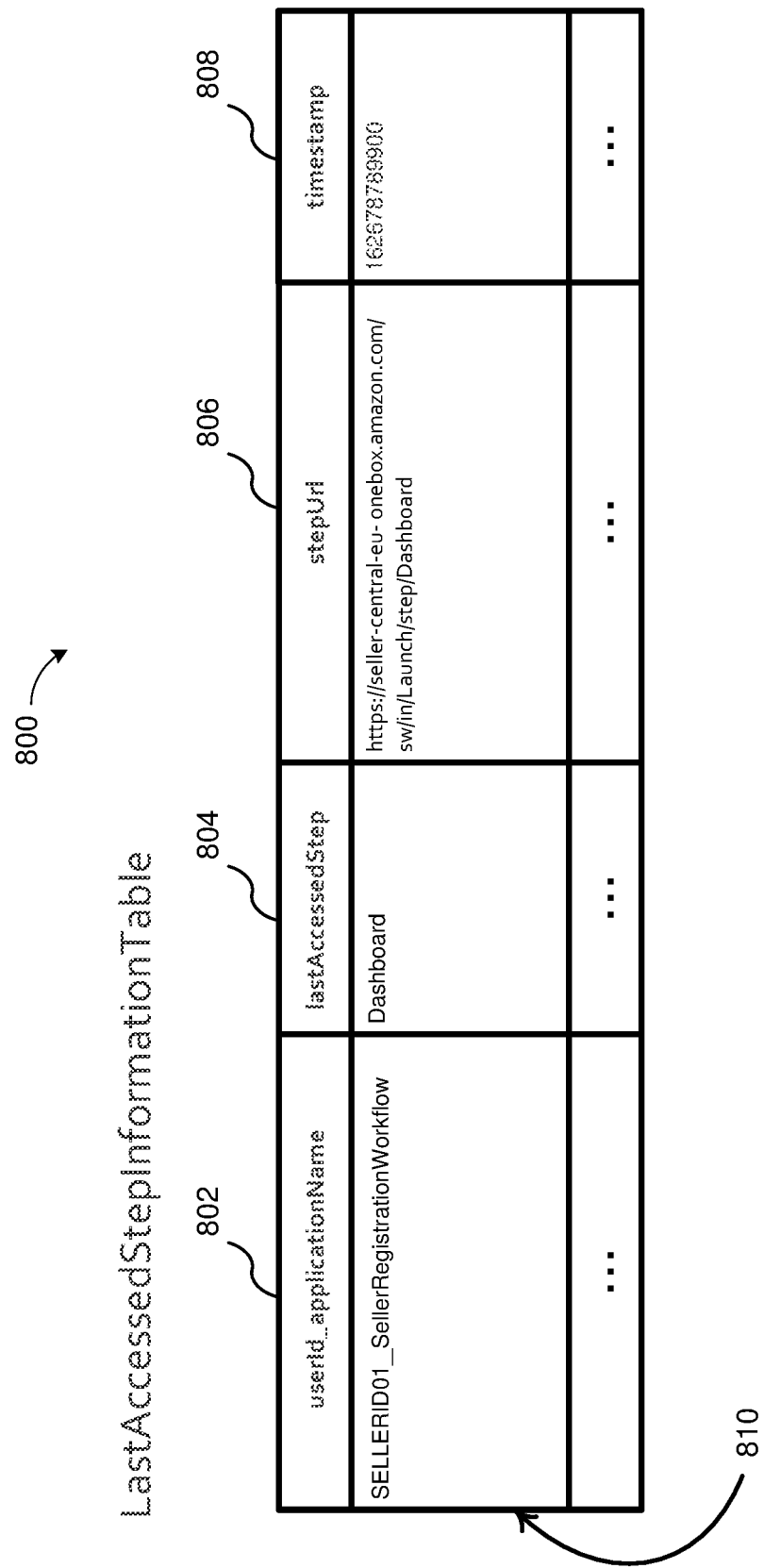
FIG. 8 shows an example data structure to store address of the webpage associated with a step name that was last accessed in a workflow.

In some embodiments, the backend Save State API function can store the information received from the application in the database using a primary key comprising a partition key and a sort key. The partition key can comprise the combination of user ID and application name. The backend Save State function API can use the Step Name as the sort key. Information other than those used in the partition key and sort key (user ID, application name and step name) can be referred to as state information. As an example, the state information can be stored in the database data structures as shown in FIGS. 6, 7 and 8, and will be described in more detail below. Using of primary key can improve the performance of searching the database and retrieving of records.

In some embodiments, the backend Save State API function can store the address of the webpage in a separate data structure in the database 144. An example of this data structure is shown in FIG. 8. This separate data structure can provide for fast and/or optimal data retrieval. The address of the webpage can be the last accessed in the workflow.

In some examples, the application 120 can also determine a tagged value list. The tagged attributes can be those that need to be accessed across the workflow or for downstream operations. For example, instead of fetching the entire webpage data, an application can optimally directly fetch only the tagged attributes. The backend Save State API function can store the tagged values in a separate data structure in the database 144. An example of this data structure is shown in FIG. 7. This separate data structure can provide for fast and/or optimal data retrieval, for example, using the combination of user ID and application name as partition key and the tag as a sort key. Tagged attributes can be retrieved at any time. Tags can be used "across steps" in a workflow. Tags can also be used across workflows. In some examples, an application can fetch one or more tags when it wants to process additional tasks based on the tagged data. For example, after a webpage is rendered, the application wants to execute a (e.g., downstream) task asynchronously that needs the value of the tagged attribute. The use of tags can be optional.

FIG. 2 shows the library 130, but it can be optional as the application 120 can generate, transmit, receive and parse Save State API requests and responses without using the library 130.

Figure 3:
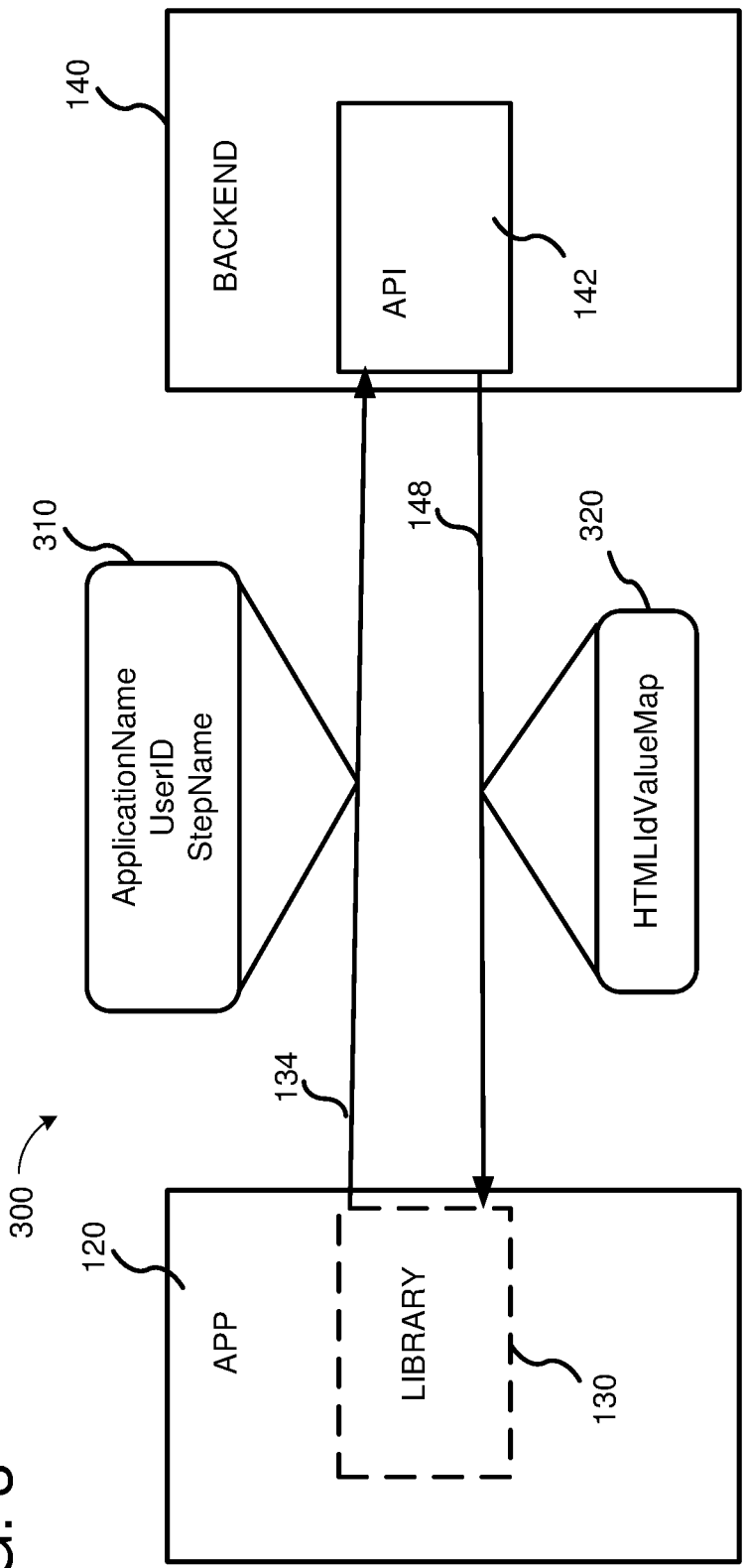
FIG. 3 is an example diagram showing an interface request call to retrieve saved information of a step in the workflow.

FIG. 3 shows an example diagram 300 showing an example Persist State API request 310 and example arguments. FIG. 3 also shows an example Persist State API response 320 and example returned argument. After having saved information of a step in the workflow at the backend server, the application 120 can determine when to retrieve (or persist) them. In an example, the request 310 can include the application name, the user identification (user ID) of the end user and the step name. The application 120 can generate and transmit, at 134, the Persist State API request 310 to the backend Persist State API function at the backend API 142. Box 312 shows example values of the attributes, corresponding to the example attributes shown in FIG. 1.

In some examples, the backend Persist State API function can use the combination of the unique user ID and unique application name as the partition key, and the step name as the sort key to look up the information in the database 144, e.g., from the data structure 600 (as shown in FIG. 6). The backend Persist State function, at 148, can return the information to the application 120 in a response 320. In this example, the response 320 comprises an HTML ID value map. Box 322 shows example values of the attributes defined in the HTML ID value map, corresponding to the example attributes shown in FIG. 1

In some examples, upon receiving the response 320, the application 120 can populate the webpage with the values (e.g., as stored in the HTML ID value map) in the received response. This can also be referred to as re-populating. In the example of FIG. 1, when the application 120 transmits a Persist State with the step name "Dashboard", the application 120, based on the information received in the response 320, can re-populate the button 112 and the check box 114 as checked, re-populate the input box 116 with the string value "FIRSTN LASTN", and input box 117 with the numeric value "123456789", and input box 118 with numeric value "123456". Input box 119 is empty. Thus, the webpage 110 now has the same state and values as when it was saved as described above.

FIG. 3 shows the library 130, but it can be optional as the application 120 can generate, transmit, receive and parse Persist State API requests and responses without using the library 130.

Figure 4:
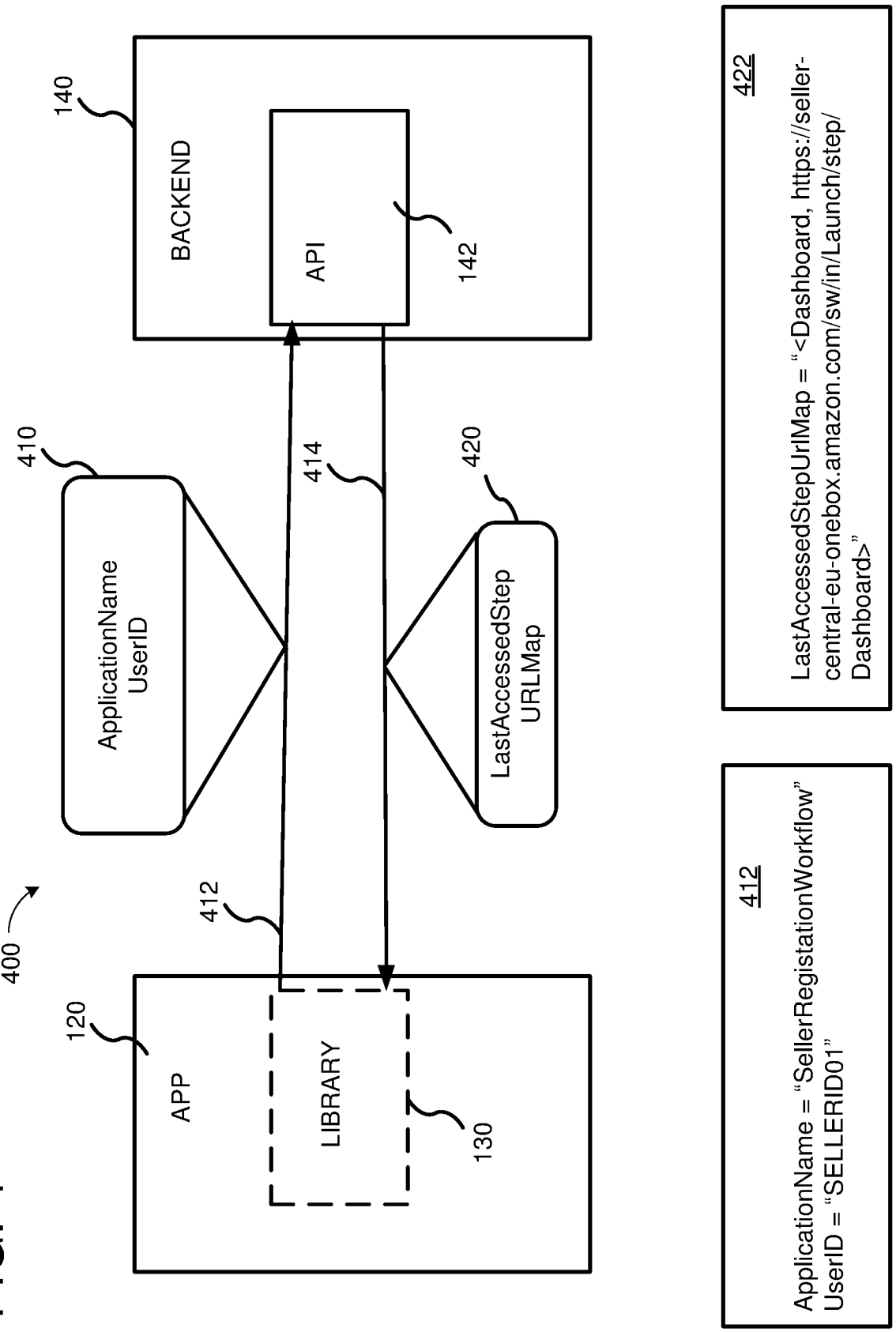
FIG. 4 is an example diagram showing an interface request call to redirect to a webpage which has been saved as the last accessed step through the save state API.

FIG. 4 shows an example diagram 400 depicting an example Redirect to Last Accessed Step API request 410 and example arguments. FIG. 4 also shows an example Redirect to Last Accessed Step API response 420 and example returned argument. In some examples, the application 120 can send a Redirect to Last Accessed Step API request 410 when it wants to redirect to a webpage which address, e.g., a URL, has been saved in the database 114. An example of the database data structure is shown in FIG. 8. In the example of FIG. 1, the application can redirect to the webpage 110 when a user selects (clicks on) the attribute 152 of the webpage 150.

In an example, the request 410 can include the application name and the user identification (user ID). The application 120 can generate and transmit, at 412, the Redirect to Last Accessed Step API request 410 to the backend Redirect to Last Accessed Step API function at the backend library 142. Box 412 shows example values of the arguments, corresponding to the example attributes shown in FIG. 1.

In some examples, an application name and a User ID in a workflow map to only one last accessed step in the workflow. As such, the backend Redirect to Last Accessed Step API function can use the combination of the unique user ID and unique application name as the primary key to look up the information in the database 144. The information can comprise the address of the webpage and its corresponding step name in the workflow. The backend Redirect to Last Accessed Step, at 414, can return the information to the application 120 in a response 420. In this example, the response 420 comprises a Last Accessed Step URL map. Box 422 shows example values of the attributes defined in the Accessed Step URL map, corresponding to the example attributes shown in FIG. 1. For example, upon receiving the request 410, the backend Redirect to Last Accessed Step API function can retrieve, e.g., using the user ID and the application name as the partition key, the last accessed step name and the last accessed step address from the data structure 800 of the database (as shown in FIG. 8). The backend Redirect to Last Accessed Step API function can then form, using the last accessed step name and the last accessed step address, the last accessed step address map, and transmit the last accessed step address map in a response 420 to the application 120 for returning the application 120 to the last accessed step that was previously stored, e.g., with the Save State API function.

FIG. 4 shows the library 130, but it can be optional as the application 120 can generate, transmit, receive and parse Last Accessed Step API requests and responses without using the library 130.

Figure 5:
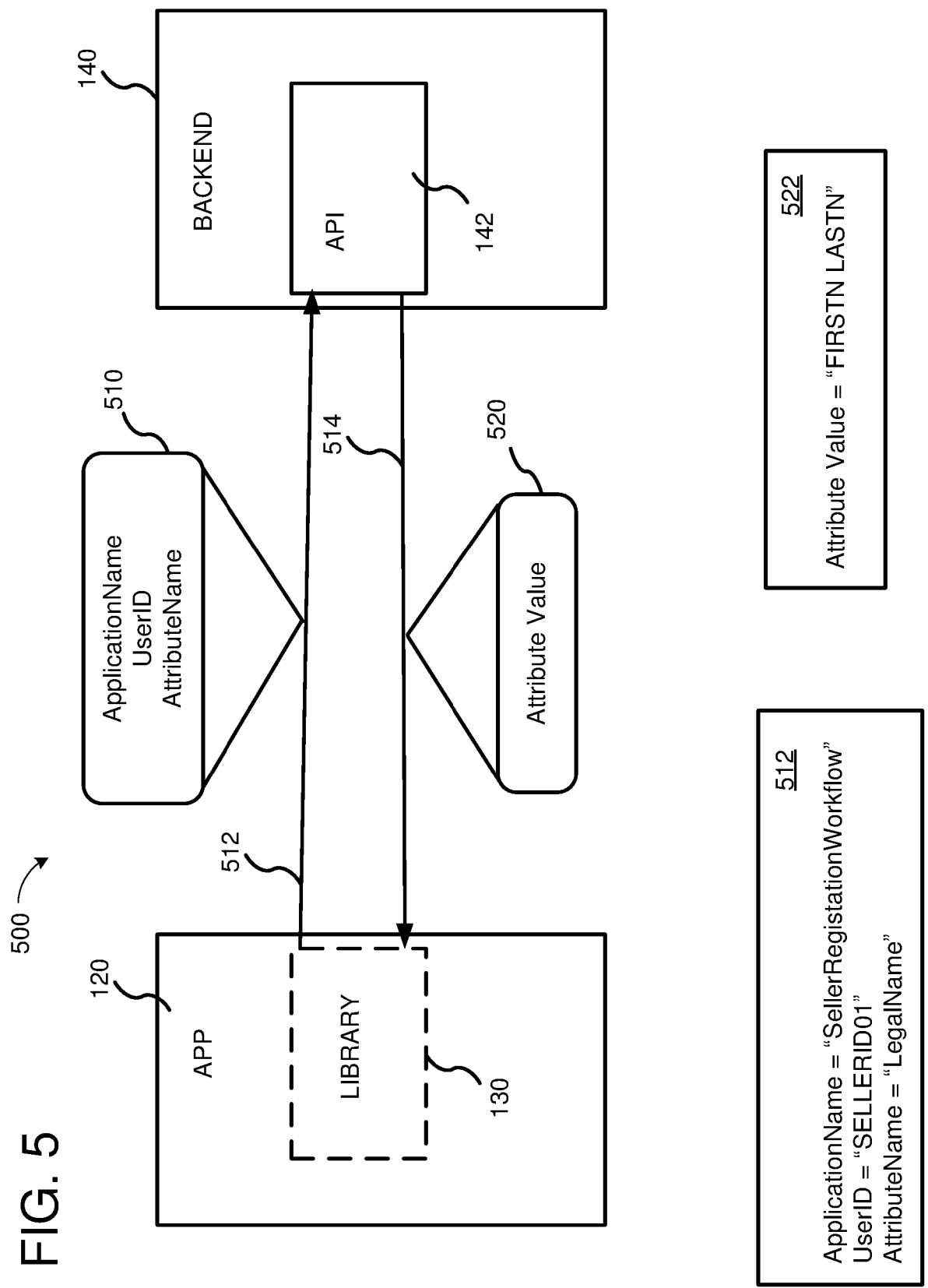
FIG. 5 is an example diagram showing an interface request call to retrieve saved values of tagged attributes.

FIG. 5 shows an example diagram 500 depicting an example Fetch Tagged Attributes API request 510 and example arguments. FIG. 5 also shows an example Fetch Tagged Attributes API response 520 and example returned argument. As described herein, the backend Save State API function can store tagged values in a separate data structure in the database 144. An example of this data structure is shown in FIG. 7. This separate data structure can provide for fast and/or optimal data retrieval, for example, by using the tag as a sort key. The request 510 includes the User ID and Application Name which can be used as partition key, and the Attribute Name for the tag can be used as sort key. The combination of the partition key (User ID+Application Name) and the sort key (tag Attribute Name) is the primary key. Database queries to primary key can take shorter time (e.g., O(1) time) and only the value of the tagged attribute is retrieved. In an example, the application 120, at 512, can send a Fetch Tagged Attributes API request 510, to the backend Fetch Tagged Attributes API function at the backend library 142, when it wants to retrieve the saved tagged attributes' values. Box 512 shows example values of the arguments, corresponding to the example attributes shown in FIG. 1.

The backend Fetch Tagged Attributes API function can use the attribute name as the sort key to look up the tagged attribute's value in the database 144 (e.g., from data structure 700 as shown in FIG. 7). The backend Fetch Tagged Attributes, at 514, can return the value to the application 120 in a response 520. Box 522 shows example values of the attribute, corresponding to the example attributes shown in FIG. 1.

FIG. 5 shows the library 130, but it can be optional as the application 120 can generate, transmit, receive and parse Fetch Tagged Attributes API requests and responses without using the library 130.

FIG. 6 shows an example data structure 600 (shown as "StateAttributeInformationTable") that can be used to store data of webpage attributes in the database 144. In the example of FIG. 6, the data structure 600 can include a UserID+ApplicationName column 602, StepName column 604, htmlIDValueMap column 606, and timestamp column 608. The UserID+ApplicationName 602 can contain a combination of a unique identifier of the application and a unique user identification. For example, in the entry row 610 of the data structure, or can be referred to as table, 600, the UserID+ApplicationName attribute 602 contains value "SELLERID01_SellerRegistrationWorkflow", which includes unique UserID "SELLERID01", and unique application name "SellerRegistrationWorkflow". The application name corresponds to the name of application 120 in FIG. 1. The stepname attribute 604 contains value "Dashboard", which corresponds to the step name 115 in FIG. 1. The htmlIdValueMap attribute 606 contains collection of name-value pairs (or "map"), <seller_legal_name_html_id, FIRSTN LASTN>, <gst_number_html_id, 123456789>, and <pan_number_html_id, 1234356>. These name-value pairs correspond to attributes 116, 117 and 118 in FIG. 1. These values can be stored in the data structure 600 by the application 120, for example, by sending a Save State API request to the backend server as described in FIG. 2. As described herein, for each entry created or updated in the data structure 600, the system can also generate a timestamp 608.

FIG. 7 shows an example data structure 700 (shown as "TaggedAttributeInformationTable") that can be used to store, in the database 144, tagged data attributes of a webpage. The backend Save State API function, as described in FIG. 2, can store selected tagged attributes for optimal retrieval of data across a workflow. The tagged data can be retrieved, for example, by the backend Fetch Tagged Attributes API as described in FIG. 5. In the example of FIG. 7, the data structure 700 can include userId_applicationName column 702, taggedVariableName column 704, taggedVariableValue column 706, and timestamp column 708. The UserID+ApplicationName 702 can contain a combination of a unique identifier of the application and a unique user identification. For example, in the entry row 710 of the data structure, or can be referred to as table, 700, the UserID+ApplicationName attribute 702 contains value "SELLERID01_SellerRegistrationWorkflow", which includes unique UserID "SELLERID01", and unique application name "SellerRegistrationWorkflow". The application name corresponds to the name of application 120 in FIG. 1. The LegalName attribute 704 contains a label, which, in this example, is the legal name of the user and corresponds to the attribute 116 in FIG. 1. In the example, the LegalName attribute contains FIRSTN LASTN, which is the legal name of the user in FIG. 1. As described herein, for each entry created or updated in the data structure 700, the system can also generate a timestamp 708.

FIG. 8 shows an example data structure 800 (shown as "LastAccessedStepInformationTable") that can be used to store, in the database 144, the address of the last webpage, or step, accessed in a workflow. As described in FIG. 2, the backend API function Save State can store the address (URL) of the webpage. In the example of FIG. 8, the data structure 800 can include userId_applicationName column 802, lastAccessedStep column 804, stepUrl column 806, and timestamp column 808. The UserID+ApplicationName 802 can contain a combination of a unique identifier of the application and a unique user identification. For example, in the entry row 810 of data structure, or table, 800, the UserID+ApplicationName attribute 802 contains value "SELLERID01 SellerRegistrationWorkflow", which includes unique UserID "SELLERID01", and unique application name "SellerRegistrationWorkflow". The application name corresponds to the name of application 120 in FIG. 1. The lastAccessedStep attribute 804 contains a step name, which, in this example, is the step name of the webpage last accessed and corresponds to the step name 115 in FIG. 1. In the example, the lastAccessedStep attribute contains "Dashboard", which is the step name of the webpage 110 in FIG. 1. The webpage can be last accessed by the user or from another webpage, for example, webpage 150 in FIG. 1. The address (URL) and the step name of the webpage can be retrieved, for example, by the backend Redirect to Last Accessed Step API as described in FIG. 4. As described herein, for each entry created or updated in the data structure 800, the system can also generate a timestamp 808.

Figure 9:
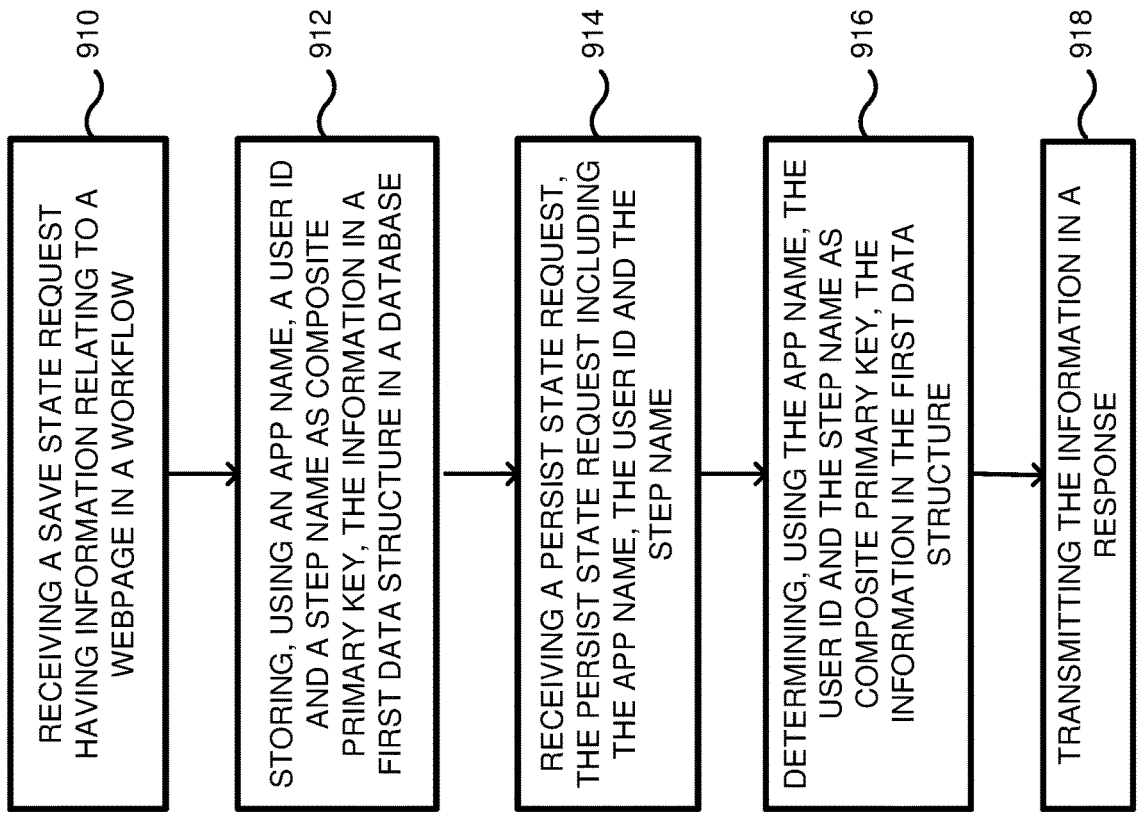
FIG. 9 is a flowchart according to one embodiment for maintaining a workflow and attribute(s) of a web-based application.

FIG. 9 is a flowchart of a method for maintaining a workflow and attribute(s) of a web-based application, according to one embodiment. In process block 910, the backend interface's Save State API receives a Save State request. The request can include information relating to a workflow of an application. For example, as described in FIG. 2, the information can include an application name, a user identification, and a step name associated with a step in the workflow. The information can also include the attribute(s) of the step, the web address (URL) of the webpage corresponding to the step, and optional tagged attributes.

In process block 912, the backend Save State API can use a composite primary key to store the information in a database. For example, the composite primary key can have a partition key comprising the application name and the user identification, and a sort key comprising the step name. The information can be stored in the example data structure StateAttributeInformationTable as shown in FIG. 6.

In process block 914, the backend interface's Persist State API receives a Persist State request. The Persist State request can include the application name, the user identification and the step name. In process block 916, the backend interface determines current value(s) of the attribute(s). For example, the backend interface can look up the values from the database using the application name and the user identification as the partition key, and the step name as the sort key.

In process block 918, the Persist State API returns the current values of the attributes, for example, in a response to the Persist State request. FIG. 3 also shows an example Persist State request and response.

Figure 10:
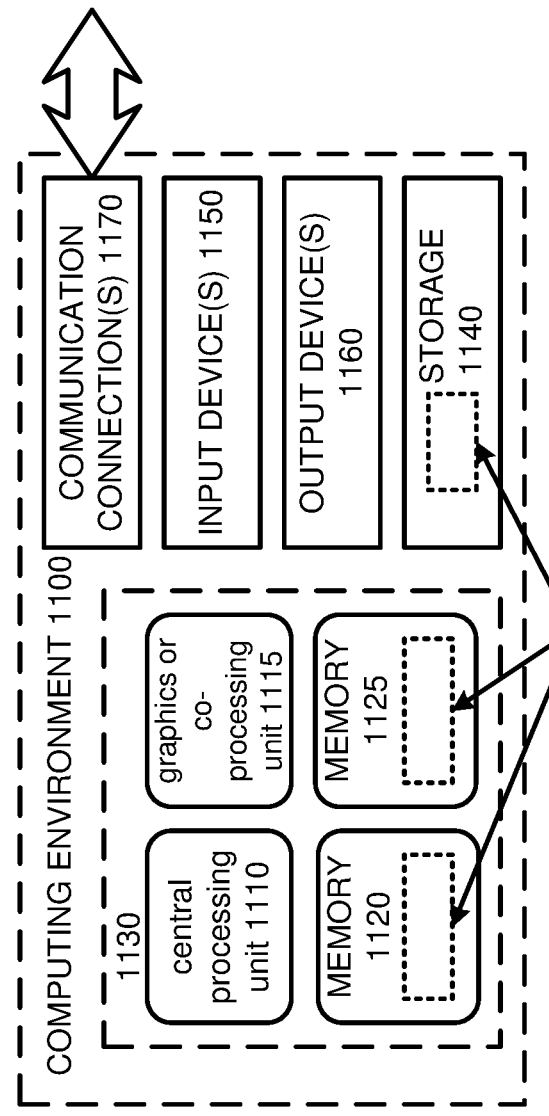
FIG. 10 depicts a generalized example of a suitable computing environment in which the described innovations can be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

In some implementations of the disclosed technology, the computer service provider 1000 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of maintaining a user state of a workflow of a web-based application having multiple pages associated with the workflow, the method comprising:
   receiving a first request, from the web-based application, for storing a state of the web-based application, the first request comprises an application name of the web-based application, a user identification of a user of the web-based application, and a step name associated with a step of the workflow, wherein the state of the web-based application comprises an attribute value map that comprises a value pair of attribute and attribute value, and a last accessed step address map;
   generating a timestamp;
   storing, in a first data structure in a database, using the application name and the user identification as a partition key and the step name as a sort key, the attribute value map, and the timestamp;
   storing, in a second data structure in the database, using the application name and the user identification as the partition key, a last accessed step name from the last accessed step address map, a last accessed step address from the last accessed step address map, and the timestamp;
   receiving a second request, from the web-based application, for the state that was previously stored, the second request comprises the application name, the user identification and the step name;
   retrieving, using the application name and the user identification as the partition key and the step name as the sort key, the attribute value map from the first data structure in the database; and
   transmitting the attribute value map in a response to the web-based application to populate the step of the web-based application to return the web-based application to the state that was stored.

2. The method of claim 1, wherein the last accessed step address map comprises a value pair of the step name and a web address.

3. The method of claim 1, wherein the first data structure comprises a first column of the first data structure for storing the application name and the user identification as the partition key, a second column of the first data structure for storing the step name as the sort key, a third column of the first data structure for storing the attribute value map, and a fifth column of the first data structure for storing the timestamp; and
   the second data structure comprises a first column of the second data structure for storing the application name and the user identification as the partition key, a second column of the second data structure for storing the last accessed step name, a third column of the second data structure for storing the last accessed step address, a fourth column of the second data structure for storing the timestamp.

4. The method of claim 1, wherein the state of the web-based application further comprises a tagged variable list, the tagged variable list comprises one or more pair of tagged attribute and associated value, the method further comprising:
   storing, in a third data structure in the database, the application name and the user identification as the partition key in a first column of the third data structure, a tagged attribute name from the tagged variable list as the sort key in a second column of the third data structure, a value from the tagged variable list in a third column of the third data structure, and the timestamp in a fourth column of the third data structure.

5. The method of claim 1 further comprising:
   receiving a third request, from the web-based application, for the last accessed step address map, the third request comprises the application name and the user identification;
   retrieving, using the application name and the user identification as a partition key, the last accessed step name and the last accessed step address from the second data structure in the database;
   forming, using the last accessed step name and the last accessed step address, the last accessed step address map; and transmitting the last accessed step address map in a response to the web-based application for returning the web-based application to the last accessed step that was stored.

6. The method of claim 4 further comprising:
receiving a fourth request, from the web-based application, for the tagged attribute that was previously stored, the fourth request comprises the application name, the user identification, and the tagged attribute;
retrieving, using the application name and the user identification as a partition key and the tagged attribute name as a sort key, the associated value of the tagged attribute from the third data structure; and
transmitting the associated value of the tagged attribute in a response to the web-based application.

7. The method of claim 1 further comprising a JavaScript library comprises functions for generating the requests and receiving the response.

8. A method executed by a processor in a computer system for maintaining a user state of a workflow of a web-based application having multiple pages associated with the workflow, the method comprising:
storing a state of the web-based application, wherein the state of the web-based application is stored in a database using a primary key comprising an application name of the web-based application, a user identification of a user of the web-based application, and a step name associated with a step of the workflow;
receiving a request, from the web-based application, for the state that was previously stored, wherein the request includes the application name, the user identification, and the step name;
retrieving the state using the application name, the user identification and the step name as the primary key for accessing the database;
transmitting the retrieved state to the web-based application to populate the step of the web-based application to return the web-based application to the state that was stored.

9. The method of claim 8, wherein the state of web-based application comprises an attribute value map comprising a value pair of attribute and attribute value, and a last accessed step address map comprising a value pair of a last accessed step name and a last accessed step address.

10. The method of claim 9, wherein the state of the web-based application further comprises a tagged variable list, the tagged variable list comprises one or more pair of tagged attribute and associated value.

11. The method of claim 9 further comprising:
receiving a second request, from the web-based application, for the last accessed step address map, the second request comprises the application name and the user identification;
retrieving, using the application name and the user identification as a partition key for accessing the database, the last accessed step name and the last accessed step address from the database;
forming, using the last accessed step name and the last accessed step address, the last accessed step address map; and
transmitting the last accessed step address map in a response to the web-based application for returning the web-based application to the last accessed step that was stored.

12. The method of claim 10 further comprising:
receiving a third request, from the web-based application, for the associated value of the tagged attribute that was previously stored, the third request comprises the application name, the user identification, and the tagged attribute;
retrieving, using the application name, the user identification and the tagged attribute as the primary key for accessing the database, the associated value of the tagged attribute; and
transmitting the associated value of the tagged attribute in a response to the web-based application.

13. The method of claim 8 further comprising:
accessing, by the web-based application, a JavaScript library comprising functions for generating the request and receiving responses.

14. A computing device, comprising:
a processor; and
a memory storing instructions that, when executed by the processor, cause the computing device to perform operations, the operations comprising:
receiving a first request, from a web-based application, to store a state of the web-based application, wherein the web-based application has multiple pages associated with a workflow;
storing the state of the web-based application in one or more data structures of a database, using a primary key comprising an application name of the web-based application, a user identification of a user of the web-based application, and a step name associated with a step of the workflow;
receiving a second request, from the web-based application, requesting the state that was previously stored, wherein the request includes the application name, the user identification, and the step name;
retrieving the state using the application name, the user identification and the step name as the primary key for accessing the one or more data structures of the database;
transmitting the retrieved state to the web-based application to populate the step of the web-based application to return the web-based application to the state that was stored.

15. The computing device of claim 14, wherein the state of the web-based application comprises an attribute value map comprising a value pair of attribute and attribute value, and a last accessed step address map comprising a value pair of a last accessed step name and a last accessed address.

16. The computing device of claim 15, wherein the state of the web-based application further comprises a tagged variable list, the tagged variable list comprises one or more pair of tagged attribute and associated value.

17. The computing device of claim 15 further comprising:
receiving a third request, from the web-based application, requesting the last accessed step address map, the third request comprises the application name and the user identification;
retrieving, using the application name and the user identification as a partition key for accessing the one or more data structures of the database, the last accessed step name and the last accessed step address from the one or more data structures of the database;
forming, using the last accessed step name and the last accessed step address, the last accessed step address map; and
transmitting the last accessed step address map in a response to the web-based application for returning the web-based application to the last accessed step that was stored.

18. The computing device of claim 16 further comprising:
receiving a fourth request, from the web-based application, requesting the associated value of the tagged attribute that was previously stored, the fourth request comprises the application name, the user identification, and the tagged attribute;
retrieving, using the application name, the user identification and the tagged attribute as the primary key for accessing the one or more data structures of the database, the associated value of the tagged attribute; and
transmitting the associated value of the tagged attribute in a response to the web-based application.

19. The method of claim 14 further comprising a JavaScript library comprises functions for generating the requests and receiving responses.

20. The method of claim 14 wherein the computing device is a remote server.

* * * * *